United States Patent
Aiken et al.

(10) Patent No.: US 8,984,174 B2
(45) Date of Patent: Mar. 17, 2015

(54) METHOD AND A PORTABLE COMPUTING DEVICE (PCD) FOR EXPOSING A PERIPHERAL COMPONENT INTERFACE EXPRESS (PCIE) COUPLED DEVICE TO AN OPERATING SYSTEM OPERABLE ON THE PCD

(75) Inventors: Craig A. Aiken, Longmont, CO (US); Gerald J. Chambers, Longmont, CO (US); Richard J. Shanks, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 13/350,931

(22) Filed: Jan. 16, 2012

(65) Prior Publication Data

US 2013/0145052 A1    Jun. 6, 2013

Related U.S. Application Data

(60) Provisional application No. 61/567,425, filed on Dec. 6, 2011.

(51) Int. Cl.
*G06F 3/00* (2006.01)
*G06F 13/00* (2006.01)
*G06F 13/372* (2006.01)

(52) U.S. Cl.
USPC ............... 710/9; 710/8; 710/104; 710/128; 710/129

(58) Field of Classification Search
USPC ............... 710/9, 313, 315, 8, 104, 128, 129
See application file for complete search history.

(56) References Cited

U.S. PATENT DOCUMENTS

| | | | |
|---|---|---|---|
| 6,119,191 A * | 9/2000 | Neal et al. | 710/311 |
| 6,832,278 B2 | 12/2004 | Oshins et al. | |
| 7,155,379 B2 * | 12/2006 | Oshins et al. | 703/21 |
| 7,689,728 B2 | 3/2010 | Hirata | |
| 7,822,900 B2 | 10/2010 | Kaushik et al. | |
| 2003/0204656 A1 * | 10/2003 | Ha | 710/301 |
| 2005/0060481 A1 * | 3/2005 | Belonoznik | 710/315 |
| 2006/0123172 A1 * | 6/2006 | Herrell et al. | 710/269 |
| 2006/0129743 A1 * | 6/2006 | Herrell et al. | 711/100 |
| 2008/0148033 A1 | 6/2008 | Sumner et al. | |
| 2008/0288661 A1 * | 11/2008 | Galles | 710/3 |
| 2010/0122009 A1 * | 5/2010 | Kurihara | 710/311 |
| 2011/0029734 A1 * | 2/2011 | Pope et al. | 711/118 |
| 2011/0106981 A1 * | 5/2011 | Watkins et al. | 710/9 |
| 2012/0030401 A1 * | 2/2012 | Cowan et al. | 710/313 |

OTHER PUBLICATIONS

International Search Report and Written Opinion—PCT/US2012/064171—ISA/EPO—Feb. 22, 2013.

(Continued)

*Primary Examiner* — Idriss N Alrobaye
*Assistant Examiner* — Getente A Yimer
(74) *Attorney, Agent, or Firm* — Nicholas A. Cole (57) ABSTRACT

In a portable computing device having a system-on-chip (SoC) Acorn RISC Machine (ARM)-based resource architecture, a peripheral component interconnect express (PCIe) bus is used to insert PCIe device memory into system memory absent a PCIe driver. During a PCIe initialization, the contents of PCIe base address registers (BARs) are mapped or otherwise updated to coincide with values assigned to the PCIe device in the advanced configuration and power interface (ACPI) tables.

13 Claims, 6 Drawing Sheets

(56) References Cited

OTHER PUBLICATIONS

Hewlett-Packard Corporation, Intel Corporation, Microsoft Corporation, Phoenix Technologies Ltd., and Toshiba Corporation; Advanced Configuration and Power Interface Specification, Dec. 30, 2005, Revision 3.0a available at http://www.acpi.info/spec30a.htm.

* cited by examiner

METHOD AND A PORTABLE COMPUTING DEVICE (PCD) FOR EXPOSING A PERIPHERAL COMPONENT INTERFACE EXPRESS (PCIE) COUPLED DEVICE TO AN OPERATING SYSTEM OPERABLE ON THE PCD

CROSS-REFERENCE TO RELATED APPLICATIONS

Priority under 35 U.S.C. §119(e) is claimed to the U.S. provisional application entitled "Method and a Portable Computing Device (PCD) For Exposing A Peripheral Component Interface Express (PCIE) Coupled Device To An Operating System Operable On The PCD," filed on Dec. 6, 2011, and assigned application Ser. No. 61/567,425, the entire contents of which are hereby incorporated by reference.

DESCRIPTION OF THE RELATED ART

The development of cheaper, smaller and more capable integrated circuits has enabled the development of portable computing systems featuring smaller, designs while retaining relatively sophisticated functionality. These computing systems refer primarily to laptops, netbooks and tablets, but also include smart phones, portable audio devices, portable video devices and portable video game consoles. However, as the recent trend of miniaturizing portable computing systems continues, the space available for hardware for these designs has progressively decreased. As a result, the optimization of hardware design and architecture has become of primary importance.

Conventional portable computing devices include at least a collection of microprocessors or a central processing unit (CPU), memory, a motherboard (e.g., central printed circuit board) featuring a chipset, and at least one graphics processing unit for generating video output to a display. In some conventional motherboard designs, the chipset is arranged into two separate component hubs. A first hub, which operates in accordance with a first controller typically handles communications among the CPU, random access memory (RAM), video output interfaces, and a second controller. In many contemporary portable computing device implementations, the video output interface is implemented as an integrated graphics processing unit. The second controller supports communications between the CPU and/or RAM with peripheral components, such as input/output devices and mass storage devices. In many implementations, the second controller may also include integrated peripherals, such as audio controllers, network interface cards, universal serial bus (USB) and PCI-express (PCIe) connections, etc.

Traditionally, netbooks and laptops have used integrated graphics solutions such as integrated graphics processing units (GPUs) coupled to the first controller. Integrated graphics processing units are graphics processors that utilize a portion of a computer's system memory rather than having its own dedicated memory. In general, integrated GPUs are cheaper to implement than dedicated or "discrete" GPUs, and offer relatively improved battery life and lower power usage, but at the cost of reduced capability and performance levels relative to discrete GPUs. Advantageously, manufacturers of netbooks and laptops have begun to offer configurations with higher graphics processing capabilities by providing computer systems that include additional discrete graphics processing units in addition to the integrated graphics processors.

Discrete or "dedicated" GPUs are distinguishable from integrated GPUs by having higher performance and also having local memory dedicated for use by the GPU that the GPU does not share with the underlying computer system. Commonly, discrete GPUs are implemented on discrete circuit boards called "video cards" which include, among other components, a GPU, the local memory, communication buses and various output terminals. In conventional applications, these video cards typically interface with the main circuit board (e.g., a motherboard) of a computing system through a PCIe interface, upon which the video card may be mounted. In general, discrete GPUs are capable of significantly higher performance levels relative to integrated GPUs but typically require and consume higher levels of power relative to integrated graphics solutions. Portable computing devices with both integrated and discrete graphics processing solutions often offer a mechanism or procedure that enables the user to alternate usage between the particular solutions so as to manage performance and battery life according to situational needs or desired performance levels.

As mentioned above, in typical netbooks and laptops, the PCIe interface is a component of the secondary controller. However, unlike PCIe interfaces in other computing systems such as desktops, the PCIe interface of a portable computing device is often of a reduced size and, consequently, of a reduced capacity. For some portable computing device designs that focus on both compact design and battery life there may be no operating system support for a PCIe interface. Such an operating system is not preconfigured with PCI or PCIe drivers. However, there may still be a need to communicate with PCIe devices despite the absence of PCI and PCIe drivers in the operating system. For example, a need to communicate with such a device could exist where a peripheral device is known, non-removable, and connected before initialization or "boot" of the operating system and where the portable computing device is not configured to support automatic configuration of such peripheral devices.

SUMMARY

This Summary introduces a selection of concepts in a simplified form that is further described below in the Detailed Description. This Summary is not intended to identify key features or essential features of the claimed subject matter, nor is it intended to be used to limit the scope of the claimed subject matter in any way.

Embodiments of the claimed subject matter are directed to systems and methods that expose a PCIe compatible device to an operating system on a portable computing device without using a PCI or PCIe driver. In an example embodiment, a method for exposing a peripheral component interconnect express (PCIe) compatible device to an operating system on a portable computing device comprises the steps of determining content for a set of PCIe base address registers that describe a PCIe compatible device, integrating the content for the set of PCIe base address registers to an advanced configuration power interface (ACPI), and using firmware to initialize a PCIe device coupled to the portable computing device by matching the content for the set of PCIe base address registers as integrated to the ACPI. Using firmware to initialize a PCIe bus may include using a unified extensible firmware interface (UEFI).

In another example embodiment, a portable computing device (PCD) that exposes a peripheral component interconnect express (PCIe) compatible device to an operating system operable on the PCD. The PCD comprises a processor coupled to a memory element having an operating system and an advanced configuration and power interface (ACPI) stored therein, an extensible host controller interface (xHCI) coupled to the processor via a PCIe bus, and a firmware element coupled to the processor and the memory element via a first bus. The firmware element includes a PCIe base address register set store with a plurality of addressable memory elements each having a respective content stored therein that match a resource, as described by information in one or more of the tables in the ACPI. The content, as forwarded to the operating system, exposes the device identified therein to the operating system.

In still another example embodiment, a portable computing device exposes a peripheral component interconnect express (PCIe) compatible device to an operating system without using a driver. The portable computing device comprises means for providing content to a set of PCIe base address registers that describe a PCIe compatible device, means for providing an advanced configuration power interface (ACPI) having the content for the set of PCIe base address registers therein and means for initializing a PCIe device within the portable computing device to match the content for the set of PCIe base address registers as contained in the ACPI.

In yet another embodiment, a computer program product includes a computer usable medium having a computer readable program code embodied therein. The computer readable program code is adapted to be executed to implement a method for configuring a portable computing device having a plurality of resources. The method comprises the steps of determining content for a set of PCIe base address registers that describe a PCIe compatible device, comparing the content for the set of PCIe base address registers to an advanced configuration power interface (ACPI) and when the content for the set of PCIe base address registers and information in the ACPI identify a PCIe device using firmware to initialize a PCIe bus coupled to the portable computing device and the PCIe device.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" describes data or information and may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, a tablet computer with a wireless connection, and a laptop computer with a wireless connection, among others.

Figure 1:
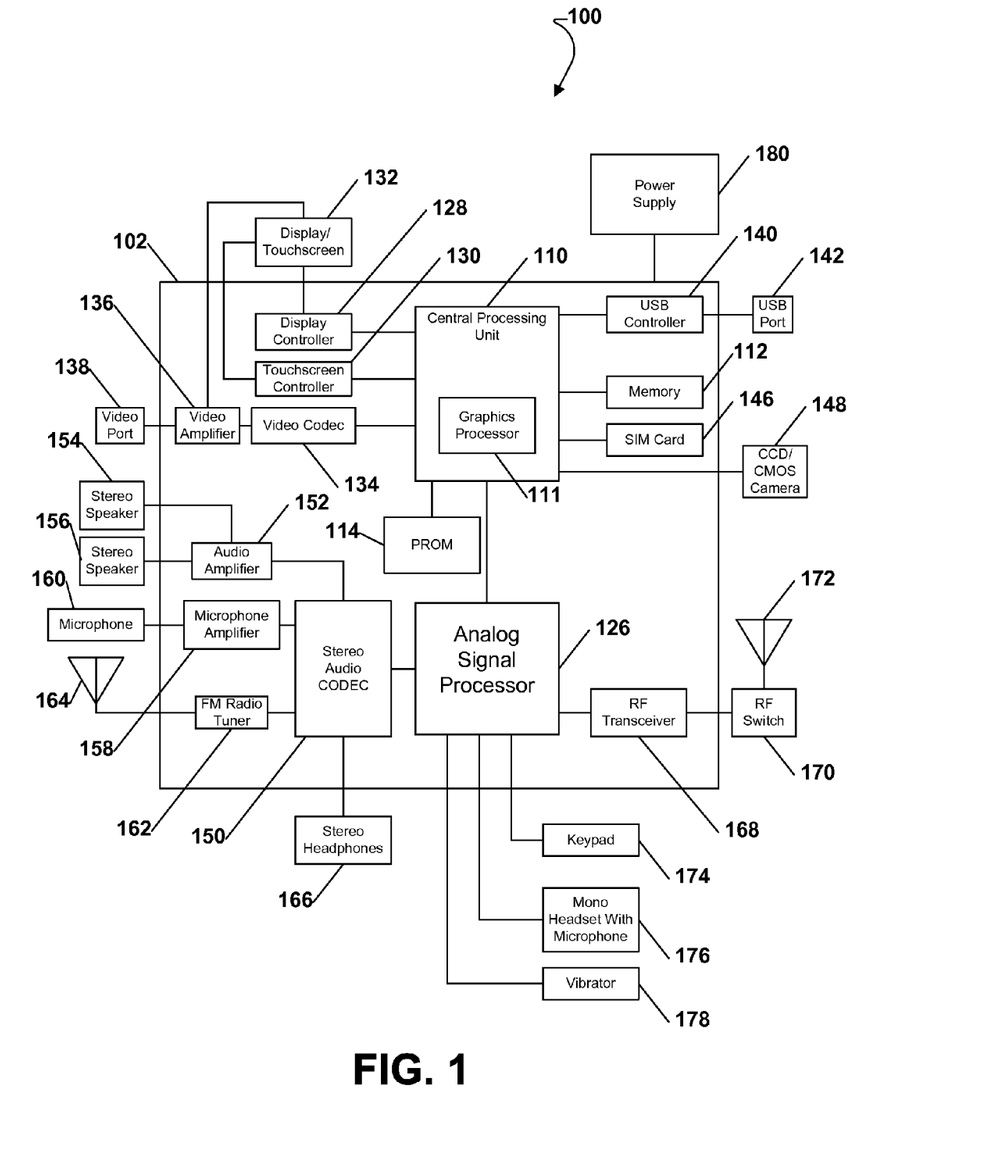
FIG. 1 is a functional block diagram illustrating exemplary elements of a portable computing device ("PCD").

FIG. 1 is a functional block diagram of an exemplary, non-limiting aspect of a PCD 100 in the form of a wireless telephone for implementing methods and systems for exposing a PCIe compatible device to an operating system operable on a portable computing device. As shown, the PCD 100 includes an on-chip system 102 that has a multi-core, central processing unit ("CPU") 110, a graphics processor 111, and an analog signal processor 126. These processors 110, 111, 126 may be coupled together on one or more system busses or another interconnect architecture, as known to one of ordinary skill in the art.

The CPU 110, the graphics processor 111 and the analog signal processor 126 may comprise a zero$^{th}$ core, a first core, etc., through an N$^{th}$ core (all not shown), as understood by one of ordinary skill in the art. In alternative embodiments, instead of CPU 110 and a graphics processor 111, one or more digital signal processors ("DSPs") may also be employed as understood by one of ordinary skill in the art. Further, in alternative embodiments, two or more multi-core processors may be included.

As shown in FIG. 1, a memory element 112 and a programmable read-only memory (PROM) 114 are coupled to the central processing unit 110. The PROM 114 includes fixed programs and data structures that support and enable control among the various hardware elements of the PCD 100. The memory element 112 includes adaptable programs, data structures and an operating system.

As illustrated in FIG. 1, a display controller 128 and a touchscreen controller 130 are coupled to the multi-core CPU 110. A touchscreen display 132 external to the on-chip system 102 is coupled to the display controller 128 and the touchscreen controller 130. Also included in PCD 100 is a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multi-core central processing unit ("CPU") 110. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable battery or a direct current ("DC") power supply that is derived from an alternating current ("AC")-to-DC transformer that is connected to an AC power source.

Some of the above-described elements of the PCD 100 may comprise hardware, while others may comprise software, and still others may comprise a combination of hardware and software. The term "resource" is used herein to refer to any such element, whether hardware, software or a combination thereof, that is controllable by a processor. A resource may be defined in one aspect as an encapsulation of the functionality of such an element. Except where it may otherwise be indicated, the term "processor" is used herein to refer to a processor such as the CPU 110, graphics processor 111, the analog signal processor 126, or to any other processor, controller or similar element that operates under the control of software, firmware, or similar control logic. A reference to two or more "processing entities" includes processors on different chips, different processing cores of the same processor chip, threads of execution on the same core, or any other processing entities between which there may be a data transport penalty or inefficiency.

As described in further detail below, an example of a resource is a software element that executes on a processor. A thread of execution on a processor, such as, for example, a thread relating to an executing application program, may access a resource by causing a "request" to be issued on the resource. As described below, resource requests are processed through a software-based system referred to in this disclosure as a "framework." The term "client" is used broadly in this disclosure to refer to an element that affects the function of requesting a resource. Thus, as the terms are used herein, a thread may create or make use of a client for the purpose of issuing resource requests. It should be noted that, in some instances, a resource may create or use a client, such that a resource may cause a resource request to be issued against another resource. As described in further detail below, such other resource may be referred to herein as a "dependent" resource due to a dependency relationship between the requesting resource and requested resource. Resources and clients may be represented by data structures in memory. Since resources are controlled by specific processors in a multi-processor PCD 100, not every processor in PCD 100 has access to every resource in PCD 100.

As known in the art, the memory element 112 includes an operating system (O/S) and an advanced configuration and power interface (ACPI) (not shown). The operating system is a program or set of programs that manage all other programs in the PCD 100. The other programs or applications use the operating system by making requests for services through a defined interface. In addition, users of the PCD can interact with the operating system through a user interface such as a command language a graphical user interface, etc. The operating system manages the sharing of memory resources and priority of execution among multiple applications, as well as the input to and output from attached hardware devices. In operation, the ACPI is used by the O/S for hardware discovery, configuration, power management and monitoring.

As will be explained in greater detail in association with the embodiments illustrated in FIG. 2 and FIG. 3, the PROM 114 includes content (i.e., data and/or data structures) that describes a PCIe compatible resource that is coupled to the PCD 100. When executed, an application program or the operating system stored in the memory 112 directs the central processing unit 110 or processor to access and deliver the content (i.e., values associated with PCIe base address registers) which may be stored in a read-only memory element (e.g., PROM 114) or in other locations within the memory 112 to the operating system. When the content is available to the operating system executing on the central processing unit 110 or processor and the content describes and coincides with values assigned in ACPI tables (also available to the operating system), the PCIe compatible resource is exposed and available for use. Note that this exposure and availability for nominal use by the PCD 100 is accomplished without support of a PCI or PCIe driver.

Accordingly, a method for exposing a PCIe compatible device to an operating system operable on the PCD 100 may include the steps of determining content for a set of PCIe base address registers that describe a PCIe compatible device, integrating the content for the set of PCIe base address registers in the ACPI stored on the PCD 100, and initializing a PCIe bus on the PCD 100 to match the content for the set of PCIe base address registers as integrated in the ACPI. In an example, system firmware such as firmware stored in the PROM 114, is accessed by software to read ACPI tables at run time to determine the appropriate PCIe content to ACPI AML mapping. In another example, software determines the appropriate PCIe content to ACPI AML mapping at compile time. Regardless of the method chosen, the PCIe initialization will configure the PCIe base address registers to coincide with values assigned in the ACPI tables. Since PCIe is a memory mapped point-to-point bus, for desired operation, the memory mapping operation should match the system hardware description defined in the ACPI.

Figure 2:
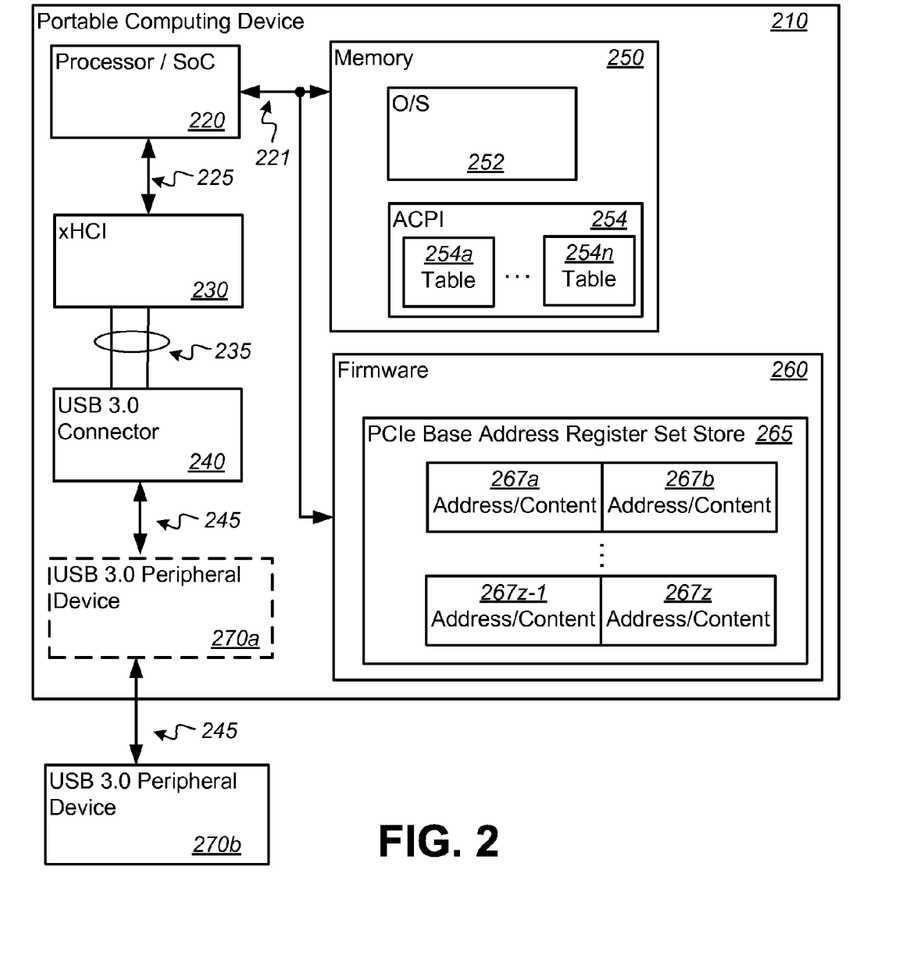
FIG. 2 is a functional block diagram illustrating exemplary elements of an alternative embodiment of a PCD.

FIG. 2 is a functional block diagram illustrating exemplary elements of an alternative embodiment of a PCD 210. The functional block diagram in FIG. 2 includes components and interconnections that illustrate an example architecture and operation of the claimed invention. It should be understood that the PCD 210 may include additional functional elements (not shown) as may be desired. Some, but not all of these additional functional elements were introduced in the embodiment described in association with FIG. 1.

As illustrated in FIG. 2, the portable computing device 210 includes a processor/SoC (system on chip) 220, an extensible host controller interface (xHCI) 230, a universal serial bus 3.0 connector 240, a memory element 250 and a firmware element 260. The memory element 250 and the firmware element 260 are coupled to the processor/SoC 220 by a first bus 221. The processor/SoC 220, which in some embodiments is constructed using an Acorn RISC Machine (ARM)-based resource architecture is coupled to the xHCI 230 by a PCIe compatible bus 225. The xHCI 230 provides high-speed differential signals over bus 235 to the USB 3.0 connector 240. The USB 3.0 connector 240 provides power and data via connection 245 to a USB 3.0 compatible peripheral device 270a in the portable computing device 210. Alternatively, the USB 3.0 connector 240 provides power and data via connection 245 to a USB 3.0 compatible peripheral device 270b, separate from the portable computing device 210.

As known in the art, the memory element 250 includes an operating system (O/S) 252 and an advanced configuration and power interface (ACPI) 254. In operation, the ACPI 254 is used by the O/S 252 for hardware discovery, configuration, power management and monitoring. The ACPI 254 defines hardware registers and basic input output system interfaces, including interpreted executable function interfaces, configuration tables, and motherboard device enumeration and configuration. In addition, the ACPI defines system and device power states and a thermal model. All of the above can be communicated via operating system independent application programming interfaces to one or more application programs executing on the PCD 210.

As further illustrated in FIG. 2, the firmware element 260 includes a PCIe base address register set store 265 having a plurality of addressable memory elements 267a-267z with respective content stored therein. The content describes a resource (e.g., a PCIe compatible device) that matches a resource (e.g., USB 3.0 peripheral device 270a or USB 3.0 peripheral device 270b), as described by information in one or more of the tables 254a-254n in the ACPI 254. When the content in the plurality of addressable memory elements 267a-267z is communicated from the firmware element 260 to the processor/SoC 220, the content exposes the PCIe compatible device 270a, 270b to the operating system 252 and application programs executing under the operating system 252.

Figure 3:
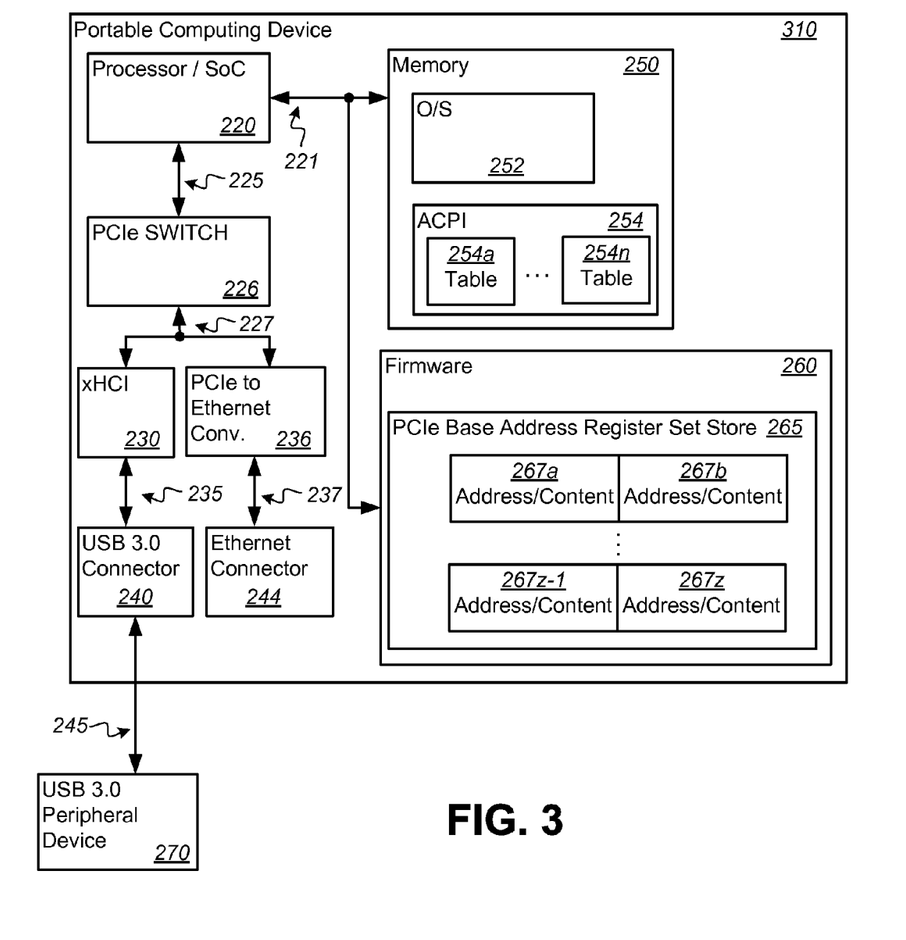
FIG. 3 is a functional block diagram illustrating exemplary elements of an alternative embodiment of a PCD.

FIG. 3 is a functional block diagram illustrating exemplary elements of an alternative embodiment of a PCD 310. The functional block diagram in FIG. 3 includes components and interconnections that illustrate an example architecture and operation of the claimed invention. The PCD 310 includes a PCIe switch 226, a PCIe to Ethernet Converter 236 and an Ethernet connector 244 in addition to those elements previously introduced in association with the PCD 210 shown in FIG. 2. It should be understood that the PCD 310 may include additional functional elements (not shown) as may be desired. Some, but not all of these additional functional elements were introduced in the embodiment described in association with FIG. 1.

As illustrated in FIG. 3, the portable computing device 310 includes a processor/SoC (system on chip) 220, an extensible host controller interface (xHCI) 230, a universal serial bus 3.0 connector 240, a memory element 250 and a firmware element 260. The memory element 250 and the firmware element 260 are coupled to the processor/SoC 220 by a first bus 221. The processor/SoC 220, which in some embodiments is constructed using an Acorn RISC Machine (ARM)-based resource architecture, is coupled to the xHCI 230 and the PCIe to Ethernet Converter 236 through a PCIe switch 226 and the PCIe compatible bus 225. The xHCI 230 and the PCIe to Ethernet Converter 236 are coupled to the PCIe switch 226 on bus 227. The xHCI 230 provides high-speed differential signals over bus 235 to the USB 3.0 connector 240. The USB 3.0 connector 240 provides power and data via connection 245 to a USB 3.0 compatible peripheral device 270. In the illustrated embodiment, the USB 3.0 peripheral device 270 is separate from the PCD 310. However, in some embodiments the USB 3.0 peripheral device 270 may be integral (i.e., within the same housing) as the portable computing device 310. The PCIe to Ethernet Converter 236 provides signals over bus 237 to the Ethernet connector 244. The Ethernet connector 244 is available to provide power and data via twisted-wire pairs in an Ethernet cable (not shown) to an Ethernet compatible device.

The memory element 250 includes an operating system (O/S) 252 and an advanced configuration and power interface (ACPI) 254. In operation, the ACPI 254 is used by the O/S 252 for hardware discovery, configuration, power management and monitoring. The ACPI 254 defines hardware registers and basic input output system interfaces, including interpreted executable function interfaces, configuration tables, and motherboard device enumeration and configuration. In addition, the ACPI defines system and device power states and a thermal model. All of the above can be communicated via operating system independent application programming interfaces to one or more application programs executing on the PCD 310.

As further illustrated in FIG. 3, the firmware element 260 includes a PCIe base address register set store 265 having a plurality of addressable memory elements 267a-267z with respective content stored therein. The content describes a resource (e.g., a PCIe compatible device) that matches a resource (e.g., the PCIe to Ethernet Converter 236), as described by information in one or more of the tables 254a-254n in the ACPI 254. When the content in the plurality of addressable memory elements 267a-267z is communicated from the firmware element 260 to the processor/SoC 220, the content exposes the PCIe to Ethernet Converter 236 to the operating system 252 and application programs executing under the operating system 252.

Figure 4:
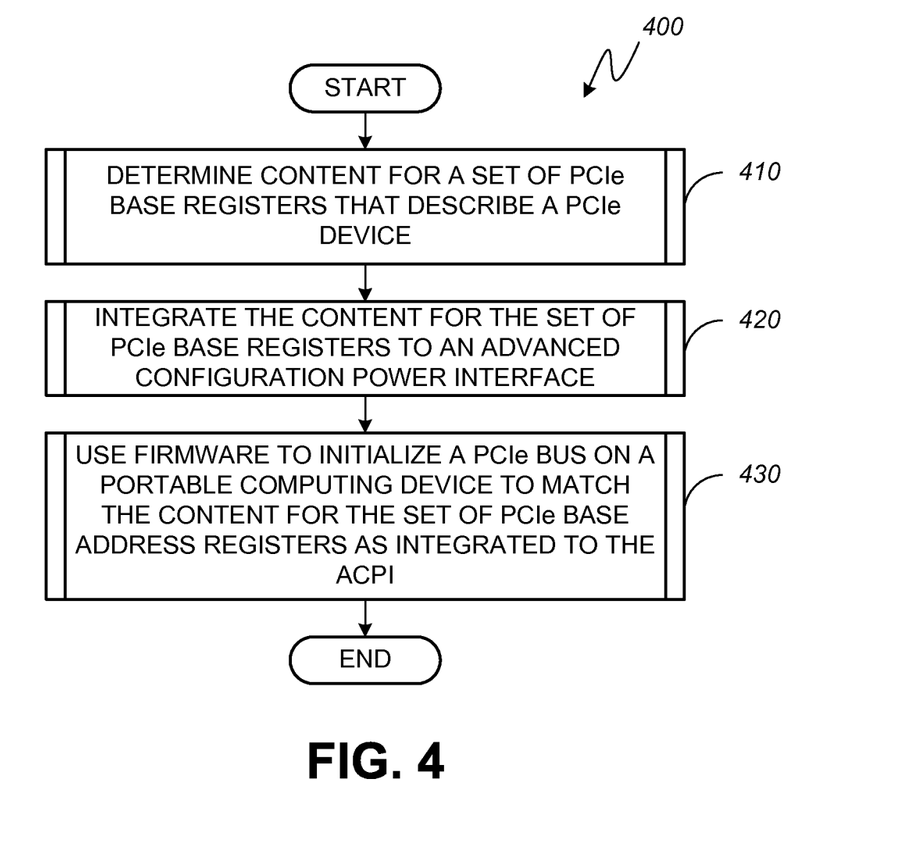
FIG. 4 is a flow diagram illustrating a method for exposing a PCIe compatible device to an operating system without using a driver.

FIG. 4 is a flowchart illustrating a method 400 for exposing a PCIe compatible device to an operating system operable on a PCD such as the PCD 210 (FIG. 2) or the PCD 310 (FIG. 3). The method begins with block 410 where content for a set of PCIe base registers that describe a PCIe device are determined. Any of a number of PCIe devices can be defined. For example, content defining one or more of a graphics processor, data storage devices, other USB 2.0 and USB 3.0 compatible devices, including but not limited to devices integrated in the PCD, communication ports or connectors compatible with these and other communication standards can be collected.

In block 420, the content for the set of PCIe base registers is integrated, communicated to or otherwise confirmed in an ACPI. The ACPI is an industry standard interface for enabling operating system directed configuration, power management, and thermal management of mobile, desktop, and server computing platforms. The ACPI replaced a collection of power management code in basic input/output systems (BIOS), application programming interfaces directed to power management, application programming interfaces directed to plug-n-play BIOS, and multiprocessor specification information. ACPI devices are described in ACPI source language, which is subsequently compiled into ACPI machine language (AML). An operating system reads AML to discover, or enumerate, ACPI devices.

In block 430, firmware in the PCD is used to initialize a PCIe bus to match information in the AML (e.g., information in Tables 254a through 254n). For example, and as described in association with the portable computing device 210 (FIG. 2) and the portable computing device 310 (FIG. 3), the content 267 stored in a store 265 of the firmware 260 is communicated at appropriate times to one or both of the processor 220 and the memory 250 to support these elements in establishing a PCIe connection between the processor 220 and one or more defined PCIe compatible devices. As indicated above, software is used to initialize the PCIe bus to match the resources described in the ACPI AML tables. As further indicated above, software may direct a read operation of the ACPI tables at runtime to determine the appropriate ACPI to PCIe mapping. Alternatively, the ACPI to PCIe mapping may be determined at compile time. Regardless of the timing, PCIe initialization configures the PCIe base address registers to coincide with values assigned in the ACPI tables.

Figure 5:
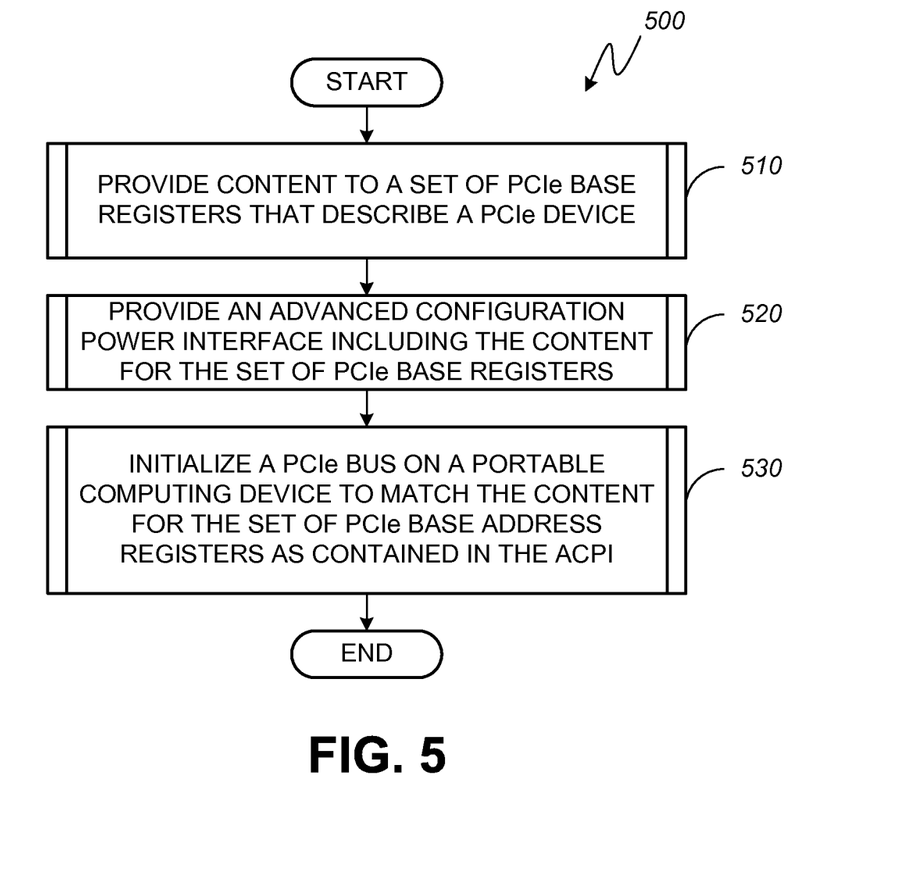
FIG. 5 is a flow diagram illustrating an alternative method for exposing a PCIe compatible device to an operating system without using a driver.

FIG. 5 is a flowchart illustrating a method 500 for configuring a PCD such as the PCD 210 (FIG. 2) or the PCD 310 (FIG. 3) to expose a PCIe compatible device to an operating system operable on the PCD. The method 500 begins with block 510 where content is provided to a set of PCIe base registers that describe a PCIe device. In the example embodiments, the content is provided to firmware element 260. Any of a number of PCIe devices can be defined. For example, content defining one or more of a graphics processor, data storage devices, other USB 2.0 and USB 3.0 compatible devices, including but not limited to devices integrated in the PCD, communication ports or connectors compatible with these and other communication standards can be provided.

In block 520, an ACPI is provided that includes AML that matches the content for the set of PCIe base registers provided in block 510. The ACPI is an industry standard interface for enabling operating system directed configuration, power management, and thermal management of mobile, desktop, and server computing platforms. ACPI devices are described in ACPI source language, which is subsequently compiled into ACPI machine language (AML). As indicated above, an operating system operable on the PCD reads the AML to discover, or enumerate, ACPI devices.

In block 530, a PCIe bus on the PCD is initialized with content that matches information in the AML (e.g., information in Tables 254a through 254n). For example, and as described in association with the portable computing device 210 (FIG. 2) and the portable computing device 310 (FIG. 3), the content 267 stored in a store 265 of the firmware 260 is communicated at appropriate times to one or both of the processor 220 and the memory 250 to support these elements in establishing a PCIe connection between the processor 220 and one or more defined PCIe compatible devices. As indicated above, software is used to initialize the PCIe bus to match the resources described in the ACPI AML tables. As also indicated above, software may direct a read operation of the ACPI tables at runtime to determine the appropriate ACPI to PCIe mapping. Alternatively, the ACPI to PCIe mapping may be determined at compile time. Regardless of the timing, PCIe initialization configures the PCIe base address registers to coincide with values assigned in the ACPI tables.

Figure 6:
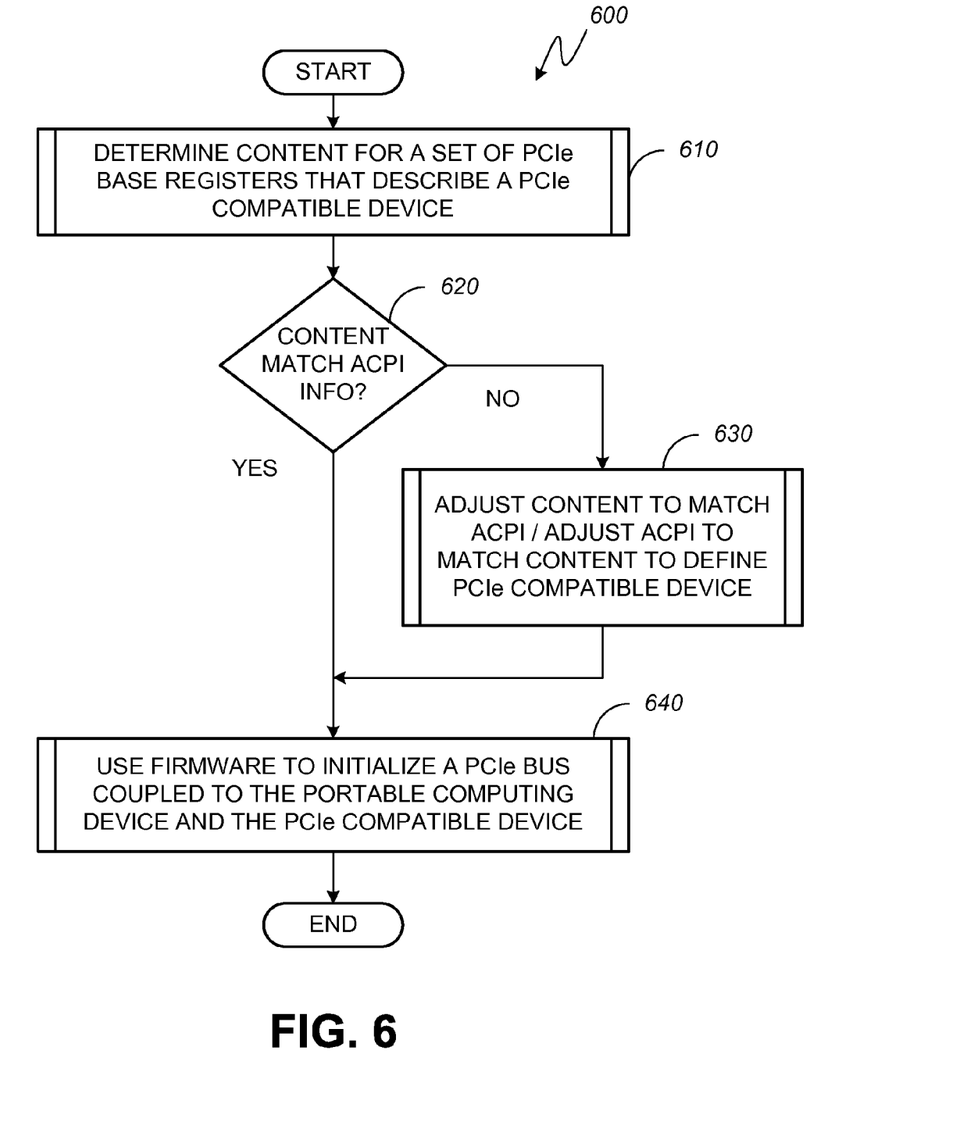
FIG. 6 is a flow diagram illustrating an alternative method for exposing a PCIe compatible device to an operating system without using a driver.

FIG. 6 is a flowchart illustrating a method 600 that can be enabled by a computer program product having a computer readable program code embodied therein, said computer readable program code adapted to be executed by the processor 220 for configuring the PCD to expose one or more PCIe compatible resources to an operating system operable on the PCD. The method 600 begins with block 610 where content for a set of PCIe base registers that describe a PCIe compatible device are determined. Any of a number of PCIe compatible devices can be defined. For example, content defining one or more of a graphics processor, data storage devices, other USB 2.0 and USB 3.0 compatible devices, including but not limited to devices integrated in the PCD, communication ports or connectors compatible with these and other communication standards can be determined.

In decision block 620, a determination or comparison is performed to verify that the content determined in block 610 matches ACPI information regarding defined PCIe compatible devices coupled to the PCD. When it is determined that the content does not match the AML, as indicated by the flow control arrow labeled "NO" exiting decision block 620, the method 600 continues with block 630 where one of the AML or the content are adjusted to define a PCIe compatible device. Otherwise, when the content matches the information in the in AML, as indicated by the flow control arrow labeled "YES" exiting decision block 620, the method 600 continues with block 640 where firmware in the PCD is used to initialize a PCIe bus to match information in the AML (e.g., information in Tables 254a through 254n). For example, and as described in association with the portable computing device 210 (FIG. 2) and the portable computing device 310 (FIG. 3), the content 267 stored in a store 265 of the firmware 260 is communicated at appropriate times to one or both of the processor 220 and the memory 250 to support these elements in establishing a PCIe connection between the processor 220 and one or more defined PCIe compatible devices. As indicated above, software is used to initialize the PCIe bus to match the resources described in the ACPI AML tables. As further indicated above, software may direct a read operation of the ACPI tables at runtime to determine the appropriate ACPI to PCIe mapping. Alternatively, the ACPI to PCIe mapping may be determined at compile time. Regardless of the timing, PCIe initialization configures the PCIe base address registers to coincide with values assigned in the ACPI tables.

In view of the disclosure above, one of ordinary skill in the art is able to write computer code or identify appropriate hardware and/or other logic or circuitry to expose a PCIe compatible device coupled to a processor via a PCIe bus to an operating system without using software drivers. One skilled in the art is able to identify appropriate hardware and/or software to without difficulty based on the flowcharts and associated description in this specification, for example, to communicate appropriate base address register content to identify a PCIe device. Therefore, disclosure of a particular set of program code instructions or detailed hardware devices is not considered necessary for an adequate understanding of how to make and use the described portable computing devices, systems and/or methods. The inventive functionality of the claimed computer implemented processes is explained in more detail in the above description and in conjunction with the drawing figures, which may illustrate various process flows. Further, the processors 110, 220, etc., in combination with the memory 112, 250 and the instructions stored therein may serve as a means for performing one or more of the method steps described herein.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage medium may be any available medium that may be accessed by a computer. By way of example, and not limitation, such computer-readable media may comprise RAM, ROM, EEPROM, CD-ROM or other optical disk storage, magnetic disk storage or other optical or magnetic storage devices, or any other medium that may be used to carry or store desired program code in the form of instructions or data structures and that may be accessed by a computer. The term "disk" or "disc," as used herein, includes but is not limited to compact disc ("CD"), laser disc, optical disc, digital versatile disc ("DVD"), floppy disk and Blu-ray disc. Combinations of the above should also be included within the scope of computer-readable media.

Although selected aspects have been illustrated and described in detail, it will be understood that various substitutions and alterations may be made therein without departing from the concepts of the present disclosure, as defined by the following claims.

What is claimed is:

1. A method for exposing a peripheral component interconnect express (PCIe) compatible device to an operating system absent a native bus driver on a portable computing device, the method comprising:
    storing content in a set of PCIe base address registers that describe a PCIe compatible device;
    integrating the content in the set of PCIe base address registers to an advanced configuration power interface (ACPI) stored in the portable computing device; and
    using firmware coupled to a processor in the portable computing device to initialize a PCIe device coupled to the portable computing device absent the driver by matching the content in the set of PCIe base address registers as integrated in the ACPI to coincide with values in the ACPI such that the PCIe device is exposed to an operating system operating within the portable computing device through the ACPI absent the driver, wherein integrating the content in the set of PCIe base address registers comprises reading a table at runtime and providing the content at compile time.

2. The method of claim 1, wherein the PCIe device is an extensible host controller interface (xHCI).

3. The method of claim 2, wherein the xHCI is coupled to a universal serial bus compatible connector and is in communication with a processor via a PCIe switch.

4. The method of claim 1, wherein using firmware to initialize a PCIe bus comprises using a unified extensible firmware interface (UEFI).

5. The method of claim 1, wherein the PCIe device is a PCIe to Ethernet converter.

6. The method of claim 5, wherein the PCIe to Ethernet converter is coupled to an Ethernet connector and is in communication with a processor via a PCIe switch.

7. A portable computing device (PCD) for exposing a peripheral component interconnect express (PCIe) compatible device to an operating system on the PCD absent a native bus driver on the portable computing device, the portable computing device comprising:
    a processor coupled to a memory element having an operating system and an advanced configuration and power interface (ACPI) stored therein;
    an extensible host controller interface (xHCI) coupled to the processor via a PCIe bus; and
    a firmware element coupled to the processor and the memory element via a first bus entirely within the PCD, the firmware element including a PCIe base address register set store having a plurality of addressable memory elements with respective content stored therein that match a resource, as described by information in one or more of the tables in the ACPI, and that expose a PCIe compatible device to the operating system in response to matched content from within the PCD through the ACPI absent the driver, wherein integrating the content in the set of PCIe base address registers comprises reading a table at runtime and providing the content at compile time.

8. The device of claim 7, wherein the xHCI is coupled to the processor via a PCIe switch.

9. The device of claim 7, wherein the xHCI is coupled to a universal serial bus compatible connector.

10. The device of claim 7, further comprising:
    a PCIe-to-Gigabit Ethernet converter coupled to the processor via a PCIe compatible switch.

11. The device of claim 10, wherein the PCIe-to-Gigabit Ethernet converter is coupled to an Ethernet compatible connector.

12. The device of claim 7, wherein a unified extensible firmware interface (UEFI) initializes a PCIe device coupled to the PCIe bus.

13. A computer program product comprising a non-transitory computer usable medium having a computer readable program code embodied therein, said computer readable program code adapted to be executed to implement a method for configuring a portable computing device having a plurality of resources, said method comprising:
    comparing content in a set of PCIe base address registers to an advanced configuration power interface (ACPI) such that the content in the set of PCIe base address registers and information in the ACPI identify a PCIe device, wherein comparing the content in the set of PCIe base address registers to information in the ACPI comprises reading a table at runtime and providing the content at compile time; and
    using firmware within the portable computing device to initialize a PCIe bus coupled to the portable computing device and the PCIe device without using a driver such that the PCIe device is available to an operating system on the portable computing device through the ACPI without use of the driver.

* * * * *